Patented Aug. 12, 1930

1,772,529

UNITED STATES PATENT OFFICE

JAMES F. WALSH, OF EAST ORANGE, AND HARRY E. SMITH AND AMERIGO F. CAPRIO, OF NEWARK, NEW JERSEY, ASSIGNORS, BY MESNE ASSIGNMENTS, TO CELLULOID CORPORATION, A CORPORATION OF NEW JERSEY

COMPOSITION OF MATTER AND METHOD OF PRODUCING THE SAME

No Drawing.   Application filed December 29, 1926.   Serial No. 157,863.

As is well known to those skilled in the art, camphor is the principal solid solvent or plasticizer for pyroxylin compounds which leave a hardened mass or film upon evaporation of the liquid constituents. Nevetheless, camphor has certain disadvantages which various inventors have sought to obviate by admixture therewith of other substances which serve to modify its properties and action. Its high cost and threatened scarcity are also reasons for using lower proportions made possible by combinations which leave its usefulness unimpaired or improved. Among the disadvantages of straight camphor as the plasticizing agent are odor, a volatility which results in warping or shrinking of goods, and a high melting point which makes it more or less difficult to avoid discoloration and other defects in the manipulation of stiffened masses, especially during the process of rolling, pressing and molding.

We find that many objections to camphor employment and attendant difficulties are overcome by adding to the camphor sufficient dibutyl phthalate, or other simple alkyl ester of phthalic acid. For example, a combination of about equal parts of camphor and dibutyl phthalate makes a very desirable mixture, but for cases which merely require a lowering of the softening point of the camphor to produce easier plasticity, we have found that the use of one part dibutyl phthalate to two parts of camphor is very effective.

Dibutyl phthalate itself as a pyroxylin plasticizer we find has certain objectionable features common to many camphor substitutes. For one thing, it is deficient in solvent power, thus adding to colloidal difficulties and adversely affecting that penetration which is important to the homogeneity of the residual combinations. This deficiency also necessitates a more liberal use of associated liquid solvents. Further, it is of lower chemical stability than camphor and is subject to hydrolysis or the liberation of deleterious acids. Still another objection is its liquid character, which is inclined to give an undesirable softness to the celluloid or other pyroxylin combination. But in spite of these characteristics, we find that the combination of a simple alkyl ester of phthalic acid with camphor recommends it as an associate plasticizer, and this we have established by research. In other words, we overcome the objectionable features of both substances and get improved effects by making a suitable combination.

Such improvement is particularly true of the incorporation process, for we prefer to grind our pyroxylin and plasticizer according to that celluloid practice which aims at thorough initial mixing. We are enabled to do this without the usual attendant loss of camphor, by first grinding the dibutyl phthalate or other simple alkyl ester of phthalic acid with the moist pyroxylin and then adding our camphor to the resultant cake after it has been freed of water. We thus make this water-insoluble liquid solvent a very practical adjunct to economical mixing. The operation referred to converts the pyroxylin to a plastic mass by first grinding it with the plasticizer, then freeing it of water, then adding camphor and alcoholic or other volatile solvent, then masticating the mixture in rolls or equivalent mechanism and finally forming it into sheets or rods or tubes in presses, planing machinery or stuffers, or the like. Suitable coloring matter is, of course, added at an appropriate stage, also such other agents as stabilizers and adulterant material.

As already stated, we prefer to first mix and grind the dibuthyl-phthalate with the pyroxylin, say ten parts to the hundred of pyroxylin, dry basis, and after the same has been dehydrated by exposure or otherwise, we add the camphor, say, twenty parts, preferably dissolved with the liquid solvents, alcohol, acetone, etc., for which the dry mixture is now ready. Both plasticizers may, however, be ground with the wet pulp, but, as explained, this leads to waste of camphor by evaporation as an incident of the dehydrating operation.

While we have given a ten part dibutyl phthalate proportion along with twenty parts of camphor as an illustration, we do not confine ourselves to these amounts. The essence of our invention is the improvement of the camphor solvent by associating it with a simple alkyl ester of phthalic acid and contrariwise, the bettering of a simple alkyl ester of phthalic acid by the addition of camphor.

By alcoholic or other volatile solvent, we mean alcohol, wood spirit, acetone, or any of the pyroxylin menstrua used to liquefy it or render it suitable for plastic operations. The volatile solvent should, of course, be compatible with pyroxylin and the camphorated plasticizer. By pyroxylin we mean the soluble variety of nitro-cellulose usually employed for celluloid or similar plastics, as well as that used for varnishes, photo-films and protective coatings.

By camphor we mean either the natural, artificial or synthetic variety, and by dibutyl phthalate we mean the commercially pure normal substance. However, any of the simple alkyl esters of phthalic acid may be advantageously used in combination with camphor to produce a composition of desirable qualities. By simple alkyl esters of phthalic acid we mean substances of the type indicated by the following formulæ, in which R and $R_1$ represent alkyl groups containing less than six carbon atoms.

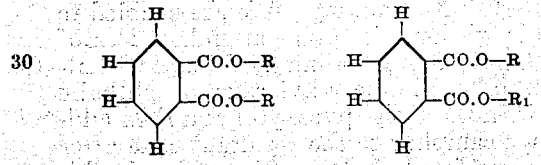

When making pyroxylin compounds higher in liquid solvent content than those we have described for sheets, rods, tubes, etc., and the like, we find it also advantageous to employ our camphor-phthalate plasticizer, but we find as well that moderate proportions of the mixture are best to avoid undesirable softness or pliability in the film left after evaporation. The liquid solvents for varnishes, lacquers, or film dopes are sufficiently well known to render description or proportions unnecessary. It is sufficient to point out that for a hard pyroxylin deposit, we recommend that the total proportion of thirty parts of 2 camphor—1 dibutyl phthalate be not exceeded, but rather lowered; unless, of course, a positive pliability be desired. The liquid compounds employing the camphor phthalate combination are also very useful as cementing agents for pyroxylin plastics.

While we recommend for these flowable solutions a basic ingredient consisting of the dried pyroxylin-camphor-dibutyl phthalate mass or cake thinned down or rendered liquid by the addition of suitable volatile menstrua, the main object of our invention can be accomplished in this instance by mixing together all of the ingredients at one operation, for the properties of our new compound plasticizer will assert themselves to a greater or less degree, even with such a departure from the practices we recommend.

By camphor, in the foregoing specification, we mean gum camphor or common camphor for commerce, either the natural kind or its equivalent by synthetic production.

The final pyroxylin compositions thus plasticized with camphor and dibutyl phthalate show easily mouldable properties, in fact more so than if camphor had been used alone. Sheets made with this mixed plasticizer have also a higher degree of pliability than those made with straight camphor, and when subjected to severe tests, retain their flexibility for a longer time. The products are less odorous, less inflammable than straight camphor material and exhibit a remarkable stability to both heat and light. They also have the advantage of reduced warpage or shrinking tendency.

We claim:

1. A solid plastic composition consisting substantially of one hundred parts pyroxylin, twenty parts camphor and ten parts dibutyl phthalate.

2. The process of making a pyroxylin compound comprising a composition of pyroxylin, camphor and a simple alkyl ester of phthalate acid where the alkyl radicals contain less than six carbon atoms, which consists in mixing ten parts dibutyl phthalate with one hundred parts hydrous pyroxylin, dry basis, and afterwards removing the water therefrom, and then adding twenty parts camphor dissolved with solvents.

JAMES F. WALSH.
HARRY E. SMITH.
AMERIGO F. CAPRIO.

CERTIFICATE OF CORRECTION.

Patent No. 1,772,529. Granted August 12, 1930, to

JAMES F. WALSH ET AL.

It is hereby certified that error appears in the printed specification of the above numbered patent requiring correction as follows: Page 2, lines 92 to 95, claim 2, strike out the words "comprising a composition of pyroxylin, camphor and a simple alkyl ester of phthalate acid where the alkyl radicals contain less than six carbon atoms,"; and that the said Letters Patent should be read with this correction therein that the same may conform to the record of the case in the Patent Office.

Signed and sealed this 23rd day of September, A. D. 1930.

(Seal)

M. J. Moore,
Acting Commissioner of Patents.